(12) United States Patent
Abonyi

(10) Patent No.: US 10,538,264 B2
(45) Date of Patent: Jan. 21, 2020

(54) INTERMEDIATE STEERING SHAFT FOR A MOTOR VEHICLE, AND METHOD FOR OPERATING AN INTERMEDIATE STEERING SHAFT FOR A MOTOR VEHICLE

(71) Applicant: Robert Bosch Automotive Steering GmbH, Schwäbisch Gmünd (DE)

(72) Inventor: Oliver Abonyi, Egerszalók (HU)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 261 days.

(21) Appl. No.: 15/550,914

(22) PCT Filed: Jan. 21, 2016

(86) PCT No.: PCT/EP2016/051224
§ 371 (c)(1),
(2) Date: Aug. 14, 2017

(87) PCT Pub. No.: WO2016/131600
PCT Pub. Date: Aug. 25, 2016

(65) Prior Publication Data
US 2018/0029631 A1    Feb. 1, 2018

(30) Foreign Application Priority Data
Feb. 16, 2015   (DE) ........................ 10 2015 102 183

(51) Int. Cl.
*B62D 1/20*      (2006.01)
*F16D 3/06*      (2006.01)
(Continued)

(52) U.S. Cl.
CPC ................ *B62D 1/20* (2013.01); *F16C 3/035* (2013.01); *F16C 29/04* (2013.01); *F16C 29/123* (2013.01); *F16D 3/065* (2013.01); *F16C 2326/24* (2013.01)

(58) Field of Classification Search
CPC .......... B62D 1/20; F16C 29/123; F16C 3/035; F16C 29/04; F16C 2326/24; F16D 3/065
(Continued)

(56) References Cited

U.S. PATENT DOCUMENTS 4,280,341 A * 7/1981 Krude .................. F16C 29/045
                                                                   464/167
8,157,660 B2 * 4/2012 Disser .................... F16C 3/035
                                                                   464/167
(Continued)

FOREIGN PATENT DOCUMENTS

DE        37 30 393 A1    3/1989
DE        600 27 225 T2   1/2007
(Continued)

OTHER PUBLICATIONS

International Search Report corresponding to PCT Application No. PCT/EP2016/051224, dated Apr. 5, 2016 (German and English language document) (7 pages).

*Primary Examiner* — Greg Binda
(74) *Attorney, Agent, or Firm* — Maginot, Moore & Beck LLP

(57) ABSTRACT

An intermediate steering shaft for a motor vehicle includes an outer hollow shaft, an inner hollow shaft that is arranged at least partially in the outer hollow shaft, and a profile shaft that is arranged in the outer hollow shaft and connects the outer hollow shaft and the inner hollow shaft to one another. The intermediate steering shaft also includes a plurality of guide arrangements that guide the profile shaft in the outer hollow shaft for displacing the profile shaft and the inner
(Continued)

hollow shaft. An elastic element is arranged between a respective guide rail and a receiving section of the profile shaft. The elastic element is configured to provide play compensation for the respective guide arrangement and to transmit a torque that acts from the outer hollow shaft on the guide arrangement to the profile shaft.

10 Claims, 8 Drawing Sheets

(51) Int. Cl.
    *F16C 3/035*     (2006.01)
    *F16C 29/04*     (2006.01)
    *F16C 29/12*     (2006.01)

(58) Field of Classification Search
    USPC ........................................................ 464/167
    See application file for complete search history.

(56) References Cited

U.S. PATENT DOCUMENTS

| | | |
|---|---|---|
| 2005/0257639 A1 | 11/2005 | Yamada |
| 2006/0053934 A1 | 3/2006 | Bahr et al. |
| 2011/0098121 A1 | 4/2011 | Bahr et al. |
| 2018/0154922 A1* | 6/2018 | Abonyi .................. B62D 1/16 |

FOREIGN PATENT DOCUMENTS

| | | |
|---|---|---|
| DE | 10 2014 017 407 A1 | 6/2016 |
| EP | 1 512 607 A1 | 3/2005 |
| EP | 1 635 081 A1 | 3/2006 |
| EP | 2 294 326 B1 | 3/2011 |
| WO | 96/20862 A1 | 7/1996 |
| WO | 2011/144715 A1 | 11/2011 |

* cited by examiner

INTERMEDIATE STEERING SHAFT FOR A MOTOR VEHICLE, AND METHOD FOR OPERATING AN INTERMEDIATE STEERING SHAFT FOR A MOTOR VEHICLE

This application is a 35 U.S.C. § 371 National Stage Application of PCT/EP2016/051224, filed on Jan. 21, 2016, which claims the benefit of priority to Serial No. DE 10 2015 102 183.8, filed on Feb. 16, 2015 in Germany, the disclosures of which are incorporated herein by reference in their entirety.

BACKGROUND

The disclosure relates to an intermediate steering shaft for a motor vehicle. The disclosure also relates to a method for operating an intermediate steering shaft for a motor vehicle.

Intermediate steering shafts are generally designed such that they can be lengthened and/or shortened. In this way, it is sought to achieve that relative movements that occur between a driver's cab and a vehicle chassis during driving operation of the motor vehicle do not have an adverse effect on the steering characteristics of the motor vehicle.

US 2011/0098121 A1 discloses a device for coupling an inner shaft and an outer shaft which are displaceable in the direction of a common axis. Balls are provided between the two shafts. The balls are arranged in axial grooves of the inner shaft and in axial grooves of the outer shaft. Each row of balls is held in position by an elastic element arranged in the groove of the inner shaft, which elastic element exerts a spring force on a roller track formed by a respective axial groove of the inner shaft and by a respective axial groove of the outer shaft.

As a result of the requirement for the spring force loading of the roller track for positioning and holding the balls in the roller track with a relatively large spring travel, a large degree of play of the balls arises depending on the action of force on the roller track. Furthermore, the abovementioned device is not suitable for use in the field of utility vehicles and the associated material loading.

The disclosure is therefore based on the object of specifying an intermediate steering shaft for a motor vehicle and a method for operating an intermediate steering shaft for a motor vehicle, which intermediate steering shaft is inexpensive to produce, is highly durable and permits effective play compensation of those components of the intermediate steering shaft which are displaceable relative to one another.

The object is achieved with an intermediate steering shaft for a motor vehicle having the features of the disclosure. The object is furthermore achieved with a method for operating an intermediate steering shaft for a motor vehicle having the features of the disclosure.

SUMMARY

The present disclosure provides an intermediate steering shaft for a motor vehicle, having an outer hollow shaft, an inner hollow shaft which is arranged at least partially in the outer hollow shaft, a profiled shaft which is arranged in the outer hollow shaft and which connects the outer hollow shaft and the inner hollow shaft to one another and a multiplicity of guide arrangements which guide the profiled shaft in the outer hollow shaft and which serve for the displacement of the profiled shaft and of the inner hollow shaft, which is connected to said profiled shaft, in an axial direction of the outer hollow shaft, wherein the multiplicity of guide arrangements has in each case one section of substantially concave form on an inner circumference of the outer hollow shaft, in each case one guide rail of substantially concave form arranged on a receiving section of the profiled shaft, and in each case a multiplicity of balls arranged between the section of in each case substantially concave form of the outer hollow shaft and the guide rail of in each case substantially concave form, wherein an elastic element is arranged between the respective guide rail and the receiving section of the profiled shaft, which elastic element is designed to provide play compensation of the guide arrangement and to transmit a torque exerted on the guide arrangement by the outer hollow shaft to the profiled shaft.

The present disclosure furthermore provides a method for operating an intermediate steering shaft for a motor vehicle. The method comprises providing an outer hollow shaft. The method furthermore comprises providing an inner hollow shaft which is arranged at least partially in the outer hollow shaft. The method moreover comprises providing a profiled shaft which is arranged in the outer hollow shaft and which connects the outer hollow shaft and the inner hollow shaft to one another. The method additionally comprises providing a multiplicity of guide arrangements which guide the profiled shaft in the outer hollow shaft and which serve for the displacement of the profiled shaft and of the inner hollow shaft, which is connected to said profiled shaft, in an axial direction of the outer hollow shaft, wherein the multiplicity of guide arrangements provides in each case one section of substantially concave form on an inner circumference of the outer hollow shaft, in each case one guide rail of substantially concave form arranged on a receiving section of the profiled shaft, and in each case a multiplicity of balls arranged between the section of in each case substantially concave form of the outer hollow shaft and the guide rail of in each case substantially concave form, wherein an elastic element is provided between the respective guide rail and the receiving section of the profiled shaft, which elastic element provides play compensation of the guide arrangement and transmits a torque exerted on the guide arrangement by the outer hollow shaft to the profiled shaft.

It is a concept of the present disclosure to improve an intermediate steering shaft for a motor vehicle such that the play compensation as a result of interaction of the respective guide rail with the elastic element permits continuous play compensation between the outer hollow shaft and the profiled shaft connected to the inner hollow shaft, wherein the guide arrangement is furthermore designed such that it can transmit a torque acting on the outer hollow shaft to the profiled shaft. Such an arrangement furthermore meets the requirements with regard to durability of the intermediate steering shaft for use in the field of utility vehicles.

Further advantages are improved vibration damping of the intermediate steering shaft through the provision of the elastic element between the respective guide rail and the receiving section of the profiled shaft. Furthermore, the intermediate steering shaft exhibits advantageously reduced friction during an axial adjustment of the inner hollow shaft relative to the outer hollow shaft.

Advantageous embodiments and refinements will emerge from the subclaims and from the description with reference to the figures.

In a preferred refinement, it is provided that the elastic element is formed by a rubber strip which can be installed, by vulcanization, between the respective guide rail and the respective receiving section of the profiled shaft. The components of the guide arrangement, that is to say the elastic element, the guide rail and the multiplicity of balls, can thus advantageously be preinstalled on the profiled shaft before the profiled shaft is inserted into the outer hollow shaft. This permits simple and inexpensive installation of the components of the intermediate steering shaft.

In a further preferred refinement, it is provided that the respective elastic element can be compressed in a thickness direction when a torque is applied and can be placed under shear load in a width direction in the case of play compensation of the guide arrangement. In this way, effective, continuous play compensation can be provided between the guide rail and the section of concave form in the outer hollow shaft for receiving the balls. Furthermore, owing to the ability of the elastic element to be placed under shear load, an effective transmission of torque from the outer hollow shaft to the inner hollow shaft can be made possible. The elastic element advantageously exhibits a high resistance force in a compression direction. This is advantageous for the transmission of torque. The elastic element furthermore exhibits a low resistance force in a shear direction. This is advantageous for play compensation.

In a further preferred refinement, it is provided that the profiled shaft has a first section with a first diameter, at which said profiled shaft is, at a respective receiving section of the profiled shaft, connected rotationally conjointly by means of the guide arrangement to an inner circumference of the outer hollow shaft, and wherein the profiled shaft has a second section with a second diameter, at which said profiled shaft is connected rotationally conjointly to an inner circumference of the inner hollow shaft, wherein the second diameter is smaller than the first diameter. By virtue of the profiled shaft being formed with sections of different diameter, it is possible to realize a simple and secure connection of the profiled shaft to the outer hollow shaft at the section with a relatively large diameter, and a connection of the profiled shaft to the inner hollow shaft at the section with relatively small diameter.

In a further preferred refinement, it is provided that the outer hollow shaft, in the region of the sections of substantially concave form on its inner circumference, has in each case one section of substantially concave form on its outer circumference, wherein a bulge of the sections formed in each case on the inner circumference of the outer hollow shaft substantially corresponds to a bulge of the sections formed in each case on the outer circumference of the outer hollow shaft. In this way, it is made possible to realize a required strength of the outer hollow shaft specifically in the regions in which a transmission of torque from the outer hollow shaft via the guide arrangement to the profiled shaft, and play compensation of the guide arrangement, are performed.

In a further preferred refinement, it is provided that a wall thickness of the outer hollow shaft is formed so as to be greater in the region of the sections of substantially concave form on its inner circumference and in the region of the sections formed on the outer circumference of the outer hollow shaft than in a remaining circumferential region of the outer hollow shaft. Owing to the punctiform relatively high loading of the outer hollow shaft in the regions of the transmission of torque between the outer hollow shaft and the profiled shaft, it is advantageous for said regions to be formed with a relatively great thickness relative to a remaining circumferential region of the outer hollow shaft.

In a further preferred refinement, it is provided that the respective guide rail is of substantially concave form on a side facing toward the outer hollow shaft and has a toothing on a side facing toward the profiled shaft, which toothing engages with a toothing of the receiving section. By virtue of the guide rail being formed with a toothing which engages into the toothing of the receiving section, it is made possible to realize an effective transmission of torque from the outer hollow shaft via the guide arrangement to the profiled shaft.

In a further preferred refinement, it is provided that the multiplicity of balls are separated from one another in each case by spacers, wherein the spacers have a cylindrical shape with inner surfaces of concave form. Through the provision of the spacers between the respective balls, it is advantageously possible for a braking effect, resulting from contact of the balls, during the axial displacement of the inner hollow shaft relative to the outer hollow shaft to be prevented.

In a further preferred refinement, it is provided that the profiled shaft has a substantially eccentric cylindrical cross section, wherein the profiled shaft has a clearance fit in a first section of the inner hollow shaft and has an interference fit in a second section of the inner hollow shaft. In this way, an insertion of the profiled shaft a short distance into the inner hollow shaft with an initially low resistance can be made possible. After the initial insertion of the profiled shaft into the inner hollow shaft, the profiled shaft is advantageously formed such that an interference fit between the profiled shaft and the inner hollow shaft can be realized. It is thus possible for a secure insertion, and a reliable transmission of torque between the profiled shaft and the inner hollow shaft, to be made possible.

In a further preferred refinement, it is provided that the elastic element is formed by a rubber strip which is installed, by vulcanization, between the respective guide rail and the respective receiving section of the profiled shaft. The components of the guide arrangement, that is to say the elastic element, the guide rail and the multiplicity of balls, can thus advantageously be preinstalled on the profiled shaft before the profiled shaft is inserted into the outer hollow shaft. This permits simple and inexpensive installation of the components of the intermediate steering shaft.

In a further preferred refinement, it is provided that the respective elastic element is compressed in a thickness direction when a torque is applied and is placed under shear load in a width direction in the case of play compensation of the guide arrangement. In this way, effective, continuous play compensation can be provided between the guide rail and the section of concave form in the outer hollow shaft for receiving the balls. Furthermore, owing to the ability of the elastic element to be placed under shear load, an effective transmission of torque from the outer hollow shaft to the inner hollow shaft can be made possible. The elastic element advantageously exhibits a high resistance force in a compression direction. This is advantageous for the transmission of torque. The elastic element furthermore exhibits a low resistance force in a shear direction. This is advantageous for play compensation.

The described embodiments and refinements may be combined with one another in any desired manner.

Further possible embodiments, refinements and implementations of the disclosure also encompass combinations, not explicitly mentioned, of features of the disclosure described above or described below with regard to the exemplary embodiments.

BRIEF DESCRIPTION OF THE DRAWINGS

The appended drawings are intended to convey further understanding of the embodiments of the disclosure. They illustrate embodiments and serve, in conjunction with the description, for explaining principles and concepts of the disclosure.

Other embodiments, and numerous of the stated advantages, will emerge with regard to the drawings. The illustrated elements of the drawings are not necessarily shown to scale with respect to one another.

In the drawings:

FIG. 1 is a schematic illustration of an intermediate steering shaft for a motor vehicle as per a preferred embodiment of the disclosure;

FIG. 2 shows a longitudinal sectional view of a partial section, indicated in FIG. 1, of the intermediate steering shaft as per the preferred embodiment of the disclosure;

FIG. 3 shows a cross-sectional view, in the section plane B-B illustrated in FIG. 2, of the intermediate steering shaft for a motor vehicle as per the preferred embodiment of the disclosure;

FIG. 4 shows a cross-sectional view, in the section plane C-C illustrated in FIG. 2, of the intermediate steering shaft for a motor vehicle as per the preferred embodiment of the disclosure;

FIG. 5 shows an enlarged detail view of the region F, illustrated in FIG. 3, of the intermediate steering shaft for a motor vehicle as per the preferred embodiment of the disclosure;

FIG. 6 shows an enlarged detail view of the region G, illustrated in FIG. 4, of the intermediate steering shaft for a motor vehicle as per the preferred embodiment of the disclosure;

FIG. 7 shows a cross-sectional view, in the section plane D-D illustrated in FIG. 2, of the intermediate steering shaft for a motor vehicle as per the preferred embodiment of the disclosure;

FIG. 8 shows a cross-sectional view, in the section plane E-E illustrated in FIG. 2, of the intermediate steering shaft for a motor vehicle as per the preferred embodiment of the disclosure;

FIG. 9 is an exploded illustration of the intermediate steering shaft for a motor vehicle as per the preferred embodiment of the disclosure;

FIG. 10 shows a cross-sectional view of an inner hollow shaft, illustrated in FIG. 9, of the intermediate steering shaft for a motor vehicle as per the preferred embodiment of the disclosure;

FIG. 11 shows a cross-sectional view of a profiled shaft, illustrated in FIG. 9, of the intermediate steering shaft for a motor vehicle as per the preferred embodiment of the disclosure; and FIG. 12 shows a flow diagram of a method for operating an intermediate steering shaft for a motor vehicle as per the preferred embodiment of the disclosure.

DETAILED DESCRIPTION

In the figures, the same reference designations are used to denote identical or functionally identical elements, parts or components, unless stated otherwise.

Figure 1:
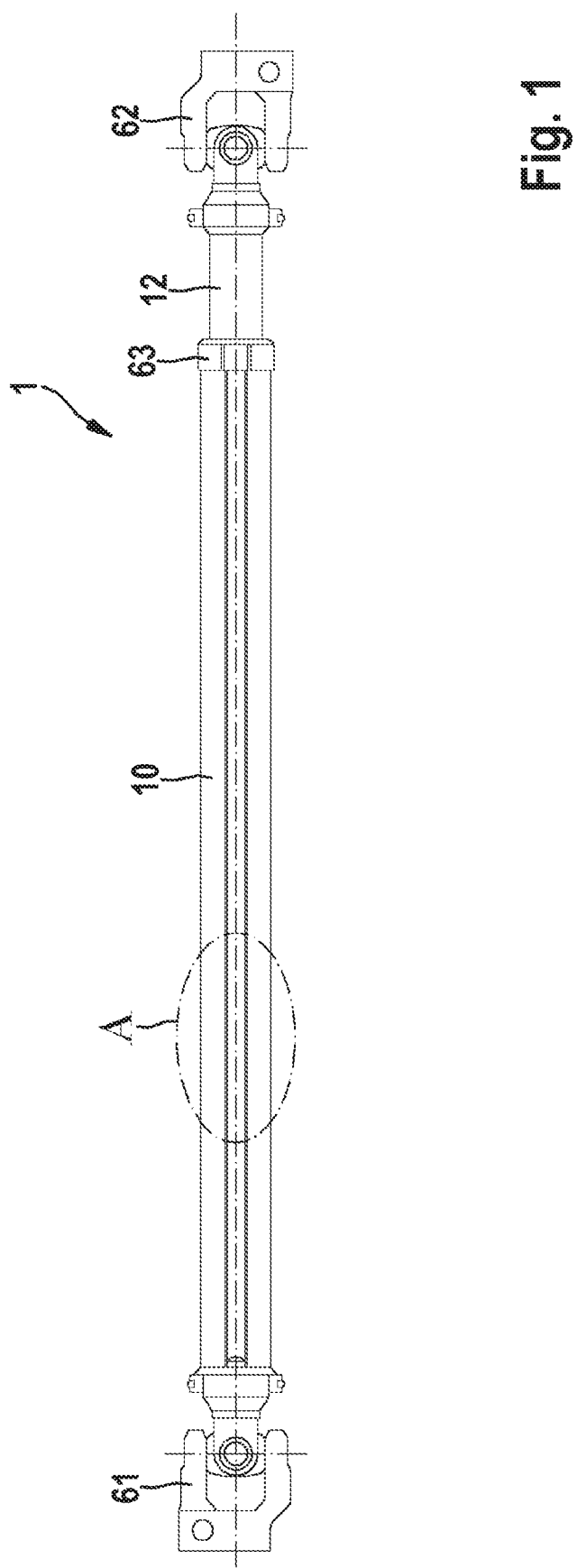

FIG. 1 is a schematic illustration of an intermediate steering shaft for a motor vehicle as per a preferred embodiment of the disclosure.

The intermediate steering shaft 1 for a motor vehicle has an outer hollow shaft 10, an inner hollow shaft 12 and a profiled shaft (not shown in FIG. 1) which connects the outer hollow shaft 10 and the inner hollow shaft 12 to one another. The intermediate steering shaft 1 is connected at a first end to a first ball joint 61 and at a second end to a second ball joint 62. The intermediate steering shaft 1 can be telescopically lengthened and shortened proceeding from an initial position in order to compensate relative movements that occur between a driver's cab and a chassis during driving operation of the motor vehicle, such that said relative movements do not have an adverse effect on the steering characteristics of the vehicle. The intermediate steering shaft 1 furthermore has, on an end of the outer hollow shaft 10 at which the inner hollow shaft 12 emerges from the outer hollow shaft 10, a stripper 63 which preferably has a seal.

Thus, in the event of a rotation of the outer hollow shaft 10 effected by means of a rotational movement of a steering column of the motor vehicle, the torque is transmitted to the inner hollow shaft 12 and from the latter to a steering gear of the motor vehicle.

Figure 2:
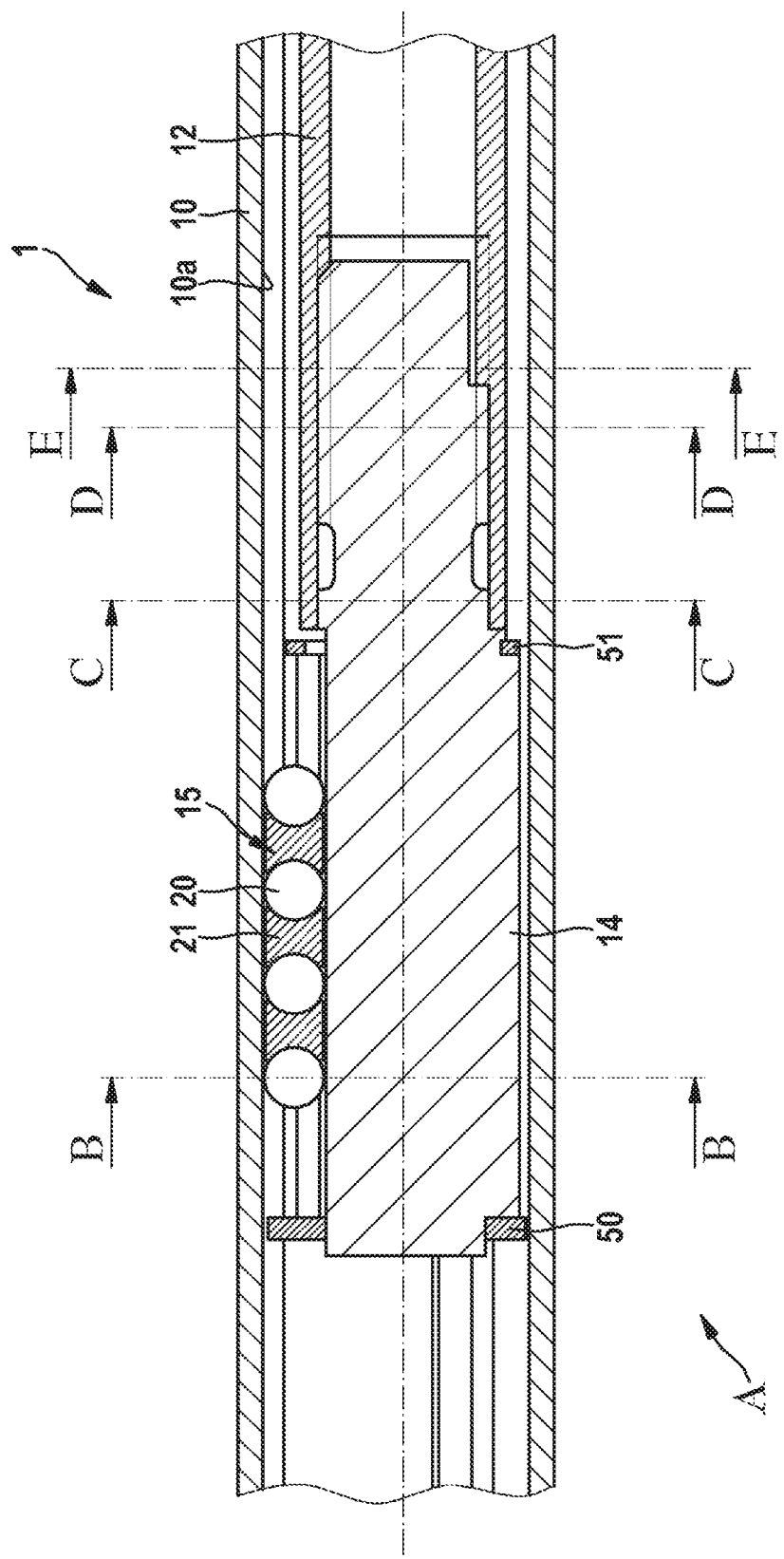

FIG. 2 shows a longitudinal sectional view through a subsection, indicated in FIG. 1, of the intermediate steering shaft as per the preferred embodiment of the disclosure.

The intermediate steering shaft 1 is shown in FIG. 2 in the assembled state. Here, the profiled shaft 14 has been inserted into the outer hollow shaft 10, to which profiled shaft the inner hollow shaft 12 is connected. The profiled shaft 14 is designed such that it can be guided in the outer hollow shaft 10 by means of a multiplicity of guide arrangements 15. The guide arrangements 15 permit a displacement of the profiled shaft 14, and of the inner hollow shaft 12 connected thereto, in the axial direction of the outer hollow shaft 10.

The multiplicity of guide arrangements 15 has in each case one section of substantially concave form (not shown in FIG. 2) on an inner circumference 10a of the outer hollow shaft 10, in each case one guide rail of substantially concave form (not shown in FIG. 2) arranged on a receiving section of the profiled shaft, and in each case a multiplicity of balls 20 arranged between the section of in each case substantially concave form of the outer hollow shaft 10 and the guide rail of in each case substantially concave form.

The balls 20 are preferably separated from one another in each case by spacers 21. The spacers 21 advantageously have a cylindrical shape with inner surfaces of concave form.

The intermediate steering shaft 1 furthermore has a securing ring 50 arranged on an end section of the profiled shaft 14. A circlip 51 is arranged in a central region of the profiled shaft 14. The securing ring 50 and the circlip 51 serve as axial delimitations of the guide arrangements 15. The securing ring 50 is pressed onto the profiled shaft 14 and is fixed there by calking.

Figure 3:
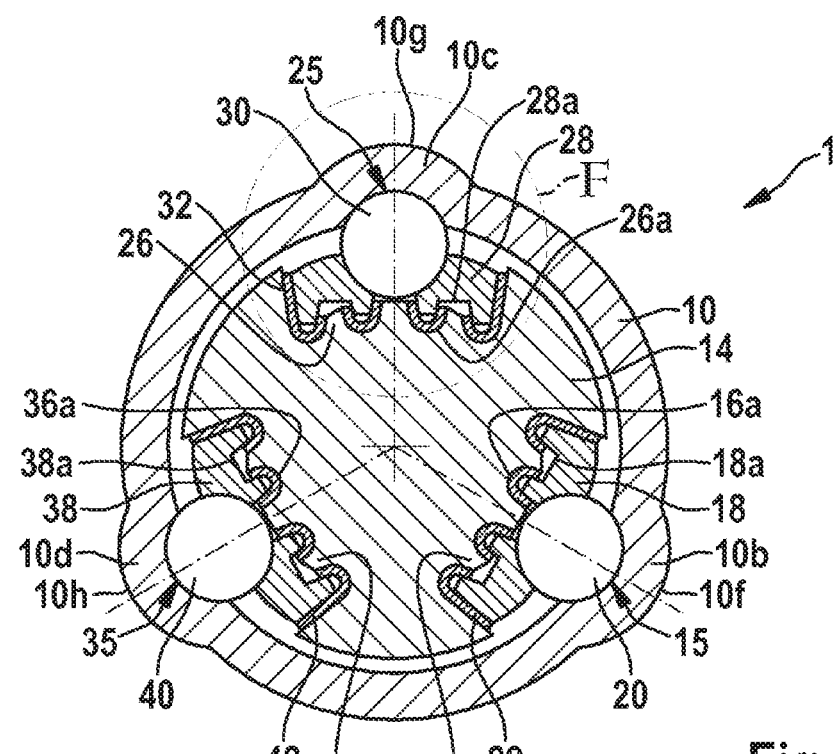

FIG. 3 shows a cross-sectional view, in the section plane B-B illustrated in FIG. 2, of the intermediate steering shaft for a motor vehicle as per the preferred embodiment of the disclosure.

In the present view, the outer hollow shaft 10 is connected to the profiled shaft 14 by means of the guide arrangements 15, 25, 35. In the present preferred embodiment, the intermediate steering shaft 1 has three guide arrangements 15, 25, 35. The guide arrangements 15, 25, 35 serve for the displacement of the profiled shaft 14 and of the inner hollow shaft 12, which is connected to said profiled shaft, in the axial direction of the outer hollow shaft 10. A first guide arrangement 15 is pre-installed on the profiled shaft 14 and has a first elastic element 22, a first guide rail 18 and a first multiplicity of balls 20.

The profiled shaft 14 has a first receiving section 16 which has a toothing 16a. The toothing 16a is of substantially undulating form. Alternatively, the toothing 16a may also have some other suitable shape. In particular, the toothing 16a in the present embodiment has three teeth. A middle tooth is arranged so as to be elevated in relation to adjacent outer teeth. A flank of the profiled shaft 14 is formed at respective end sections of the toothing 16a of the receiving section 16, such that the first receiving section 16 is arranged in the direction of a central axis of the profiled shaft 14 relative to a radial end section of the flank of the profiled shaft 14.

A first guide rail 18 of the first guide arrangement 15 is preferably of concave form on a first side facing towards the outer hollow shaft 10 and has a toothing 18a on a second side facing toward the profiled shaft 14. The toothing 18a of the first guide rail 18 is preferably formed so as to engage into the toothing 16a of the first receiving section 16. Between the toothing 16a of the first receiving section 16 and the toothing 18a of the first guide rail, there is preferably arranged a first elastic element 22. The first elastic element 22 is preferably designed to realize play compensation of the first guide arrangement 15.

Furthermore, the first elastic element 22 is designed to transmit a torque exerted on the first guide arrangement 15 by the outer hollow shaft 10 to the profiled shaft 14. The first elastic element 22 is preferably formed by a rubber strip. Alternatively, the first elastic element 22 may also be formed by some other suitable material. The rubber strip can be installed, by vulcanization, between the first guide rail 18 and the first receiving section 16 of the profiled shaft 14. A first multiplicity of balls 20 is arranged on that side of the first guide rail 18 which is of substantially concave form.

Adjacent to the first guide arrangement 15, in particular adjacent to that side of the first guide rail 18 which is of substantially concave form, the outer hollow shaft 10 has, on the inner circumference 10a, a first section 10b of substantially concave form. The first multiplicity of balls 20 is preferably arranged so as to be arranged between that side of the first guide rail 18 which is of substantially concave form and the first section 10b, of substantially concave form, on the inner circumference 10a of the outer hollow shaft 10. Furthermore, in the region of the first section 10b of substantially concave form on its inner circumference 10a, the outer hollow shaft 10 has a first section 10f of substantially concave form on its outer circumference 10e. A bulge of the first section 10b formed on the inner circumference 10a of the outer hollow shaft 10 corresponds substantially to a bulge of the first section 10f formed on the outer circumference 10e of the outer hollow shaft 10.

A second guide arrangement 25 is pre-installed on the profiled shaft 14 and has a second elastic element 32, a second guide rail 28 and a second multiplicity of balls 30.

The profiled shaft 14 has a second receiving section 26 which has a toothing 26a. The toothing 26a is of substantially undulating form. Alternatively, the toothing 26a may also have some other suitable shape. In particular, the toothing 26a in the present embodiment has three teeth. A middle tooth is arranged so as to be elevated in relation to adjacent outer teeth. A flank of the profiled shaft 14 is formed at respective end sections of the toothing 26a of the second receiving section 26, such that the second receiving section 26 is arranged in the direction of a central axis of the profiled shaft 14 relative to a radial end section of the flank of the profiled shaft 14.

A second guide rail 28 of the second guide arrangement 25 is preferably of concave form on a first side facing towards the outer hollow shaft 10 and has a toothing 28a on a second side facing toward the profiled shaft 14. The toothing 28a of the second guide rail 28 is preferably formed so as to engage into the toothing 26a of the second receiving section 26. Between the toothing 26a of the second receiving section 26 and the toothing 28a of the second guide rail 28, there is preferably arranged a second elastic element 32. The second elastic element 32 is preferably designed to realize play compensation of the second guide arrangement 25.

Furthermore, the second elastic element 32 is designed to transmit a torque exerted on the second guide arrangement 25 by the outer hollow shaft 10 to the profiled shaft 14. The second elastic element 32 is preferably formed by a rubber strip. Alternatively, the second elastic element 32 may also be formed by some other suitable material. The rubber strip can be installed, by vulcanization, between the second guide rail 28 and the second receiving section 26 of the profiled shaft 14. A second multiplicity of balls 30 is arranged on that side of the second guide rail 28 which is of substantially concave form.

Adjacent to the second guide arrangement 25, in particular adjacent to that side of the second guide rail 28 which is of substantially concave form, the outer hollow shaft 10 has, on the inner circumference 10a, a second section 10c of substantially concave form. The second multiplicity of balls 30 is preferably arranged so as to be arranged between that side of the second guide rail 28 which is of substantially concave form and the second section 10c, of substantially concave form, on the inner circumference 10a of the outer hollow shaft 10. Furthermore, in the region of the second section 10c of substantially concave form on its inner circumference 10a, the outer hollow shaft 10 has a second section 10g of substantially concave form on its outer circumference 10e. A bulge of the second section 10c formed on the inner circumference 10a of the outer hollow shaft 10 corresponds substantially to a bulge of the second section 10g formed on the outer circumference 10e of the outer hollow shaft 10.

A third guide arrangement 35 is pre-installed on the profiled shaft 14 and has a third elastic element 42, a third guide rail 38 and a third multiplicity of balls 40.

The profiled shaft 14 has a third receiving section 36 which has a toothing 36a. The toothing 36a is of substantially undulating form. Alternatively, the toothing 36a may also have some other suitable shape. In particular, the toothing 36a in the present embodiment has three teeth. A middle tooth is arranged so as to be elevated in relation to adjacent outer teeth. A flank of the profiled shaft 14 is formed at respective end sections of the toothing 36a of the third receiving section 36, such that the third receiving section 36 is arranged in the direction of a central axis of the profiled shaft 14 relative to a radial end section of the flank of the profiled shaft 14.

A third guide rail 38 of the third guide arrangement 35 is preferably of concave form on a first side facing towards the outer hollow shaft 10 and has a toothing 38a on a second side facing toward the profiled shaft 14. The toothing 38a of the third guide rail 38 is preferably formed so as to engage into the toothing 36a of the second receiving section 36. Between the toothing 36a of the third receiving section 36 and the toothing 38a of the third guide rail 38, there is preferably arranged a third elastic element 42. The third elastic element 42 is preferably designed to realize play compensation of the third guide arrangement 35.

Furthermore, the third elastic element 42 is designed to transmit a torque exerted on the third guide arrangement 35 by the outer hollow shaft 10 to the profiled shaft 14. The third elastic element 42 is preferably formed by a rubber strip. Alternatively, the third elastic element 42 may also be formed by some other suitable material. The rubber strip can be installed, by vulcanization, between the third guide rail 38 and the third receiving section of the profiled shaft 14. A third multiplicity of balls 40 is arranged on that side of the third guide rail 38 which is of substantially concave form.

Adjacent to the third guide arrangement 35, in particular adjacent to that side of the third guide rail 38 which is of substantially concave form, the outer hollow shaft 10 has, on the inner circumference 10a, a third section 10d of substantially concave form. The third multiplicity of balls 40 is preferably arranged so as to be arranged between that side of the third guide rail 38 which is of substantially concave form and the third section 10d, of substantially concave form, on the inner circumference 10a of the outer hollow shaft 10. Furthermore, in the region of the third section 10d of substantially concave form on its inner circumference 10a, the outer hollow shaft 10 has a third section 10h of substantially concave form on its outer circumference 10e. A bulge of the third section 10d formed on the inner circumference 10a of the outer hollow shaft 10 corresponds substantially to a bulge of the third section 10h formed on the outer circumference 10e of the outer hollow shaft 10.

Figure 4:
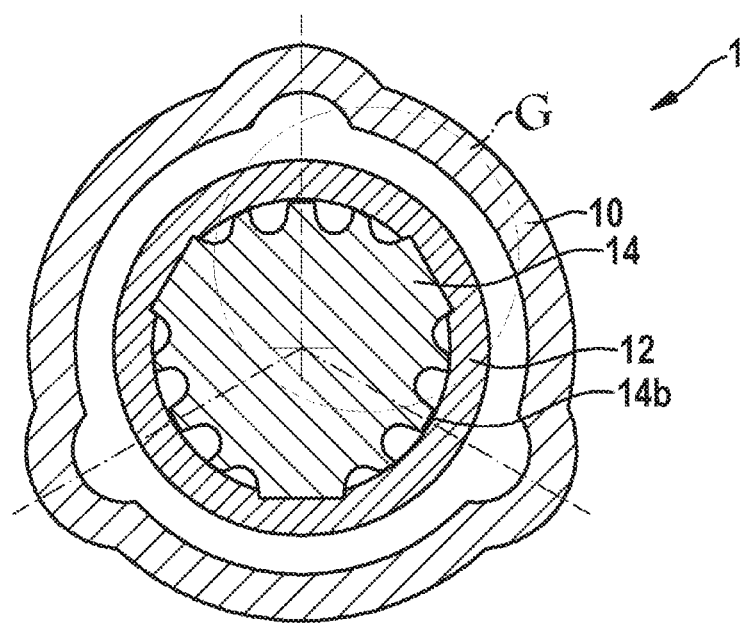

FIG. 4 shows a cross-sectional view, in the section plane C-C illustrated in FIG. 2, of the intermediate steering shaft for a motor vehicle as per the preferred embodiment of the disclosure.

The profiled shaft 14, in particular a second section 14b of the profiled shaft 14, which has a smaller diameter than a first section 14a of the profiled shaft 14, is inserted into the inner hollow shaft 12 with an interference fit.

Figure 5:
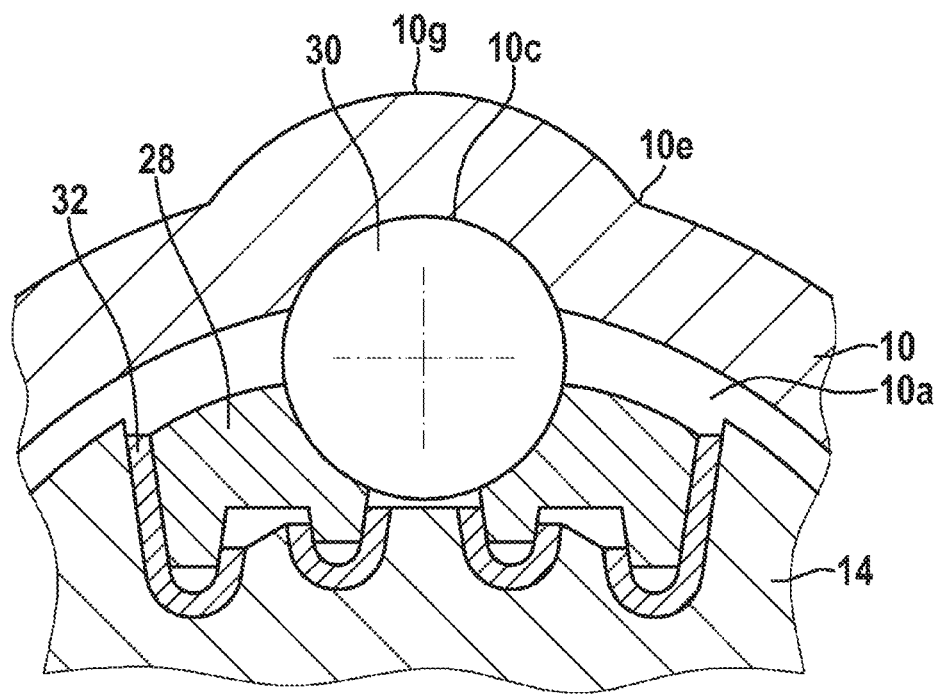

FIG. 5 shows an enlarged detail view of the region F, illustrated in FIG. 3, of the intermediate steering shaft for a motor vehicle as per the preferred embodiment of the disclosure. A wall thickness of the outer hollow shaft 10 is preferably formed so as to be greater in the region of the second section 10c of substantially concave form on its inner circumference 10a and in the region of the second section 10g formed on the outer circumference 10e of the outer hollow shaft 10 than in a remaining circumferential region of the outer hollow shaft 10, other than at the other sections 10b, 10d, 10f, 10h of concave form.

Figure 6:
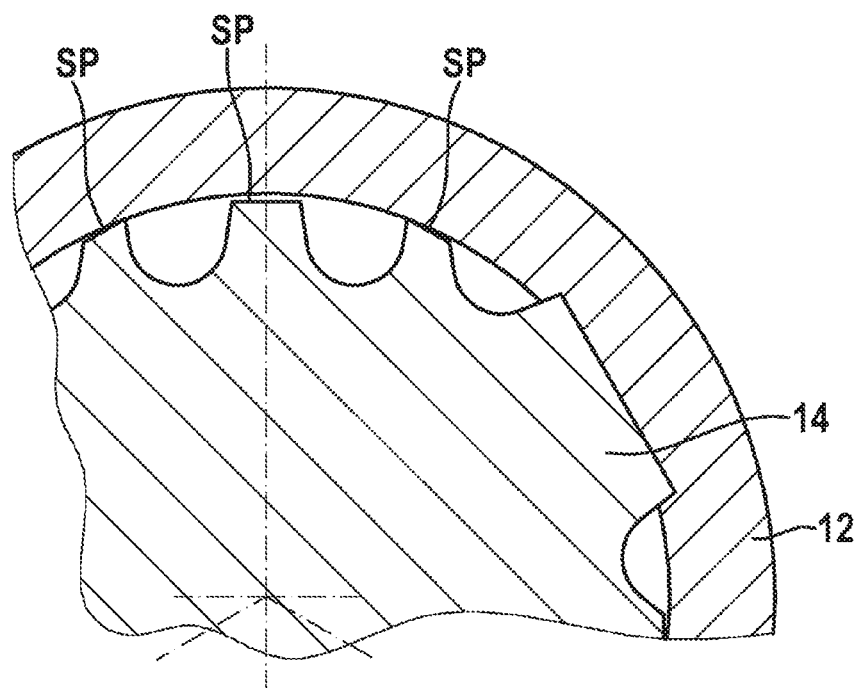

FIG. 6 shows an enlarged detail view of the region G, illustrated in FIG. 4, of the intermediate steering shaft for a motor vehicle as per the preferred embodiment of the disclosure. In the enlarged detail view illustrated, the profiled shaft 14 has a clearance fit SP in the inner hollow shaft 12. The profiled shaft 14 is preferably formed so as to have a clearance fit in a first section of the hollow shaft 12 and an interference fit in a second section of the hollow shaft 12.

Figure 7:
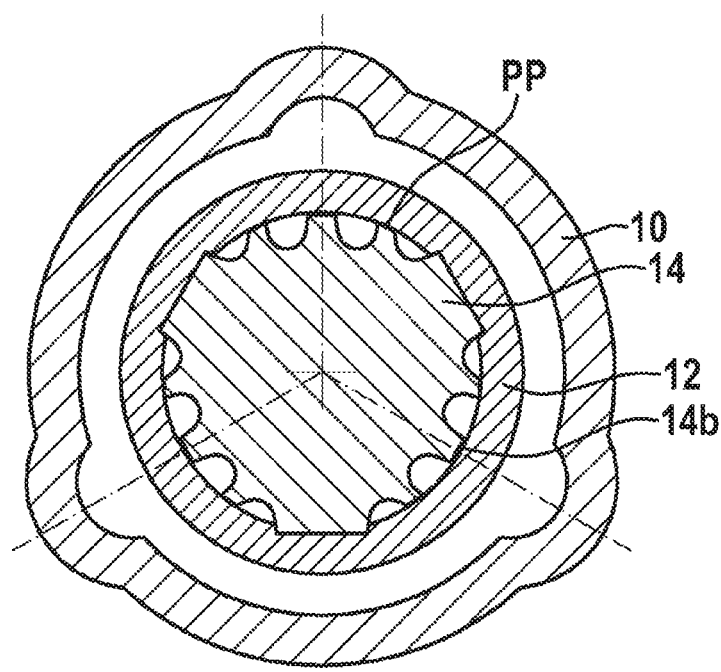

FIG. 7 shows a cross-sectional view, in the section plane D-D illustrated in FIG. 2, of the intermediate steering shaft for a motor vehicle as per the preferred embodiment of the disclosure. In the illustrated section of the inner hollow shaft 12, the profiled shaft 14 has an interference fit PP in the inner hollow shaft 12.

Figure 8:
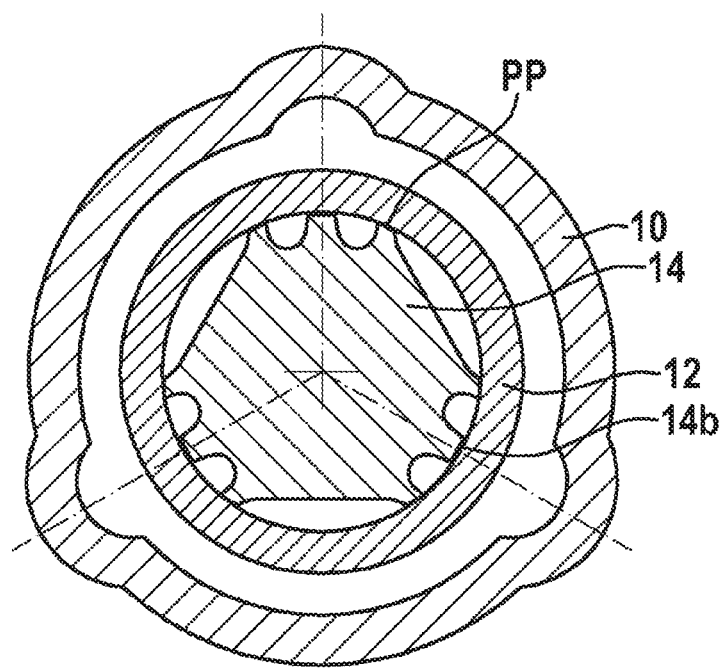

FIG. 8 shows a cross-sectional view, in the section plane E-E illustrated in FIG. 2, of the intermediate steering shaft for a motor vehicle as per the preferred embodiment of the disclosure. In the detail view shown in FIG. 8, the profiled shaft 14 preferably has a substantially triangular cross section with rounded edges. The rounded edges of the profiled shaft 14 preferably additionally have a profile or a toothing which substantially corresponds to the toothing 16a of the receiving section 16 of the profiled shaft 14. In this illustration, a foremost section of the profiled shaft 14, in particular of the second section 14b of the profiled shaft 14, is shown. It is likewise possible to see the eccentric shape of the illustrated section 14b of the profiled shaft 14, by means of which the interference fit PP in the inner hollow shaft 12 is made possible.

Figure 9:
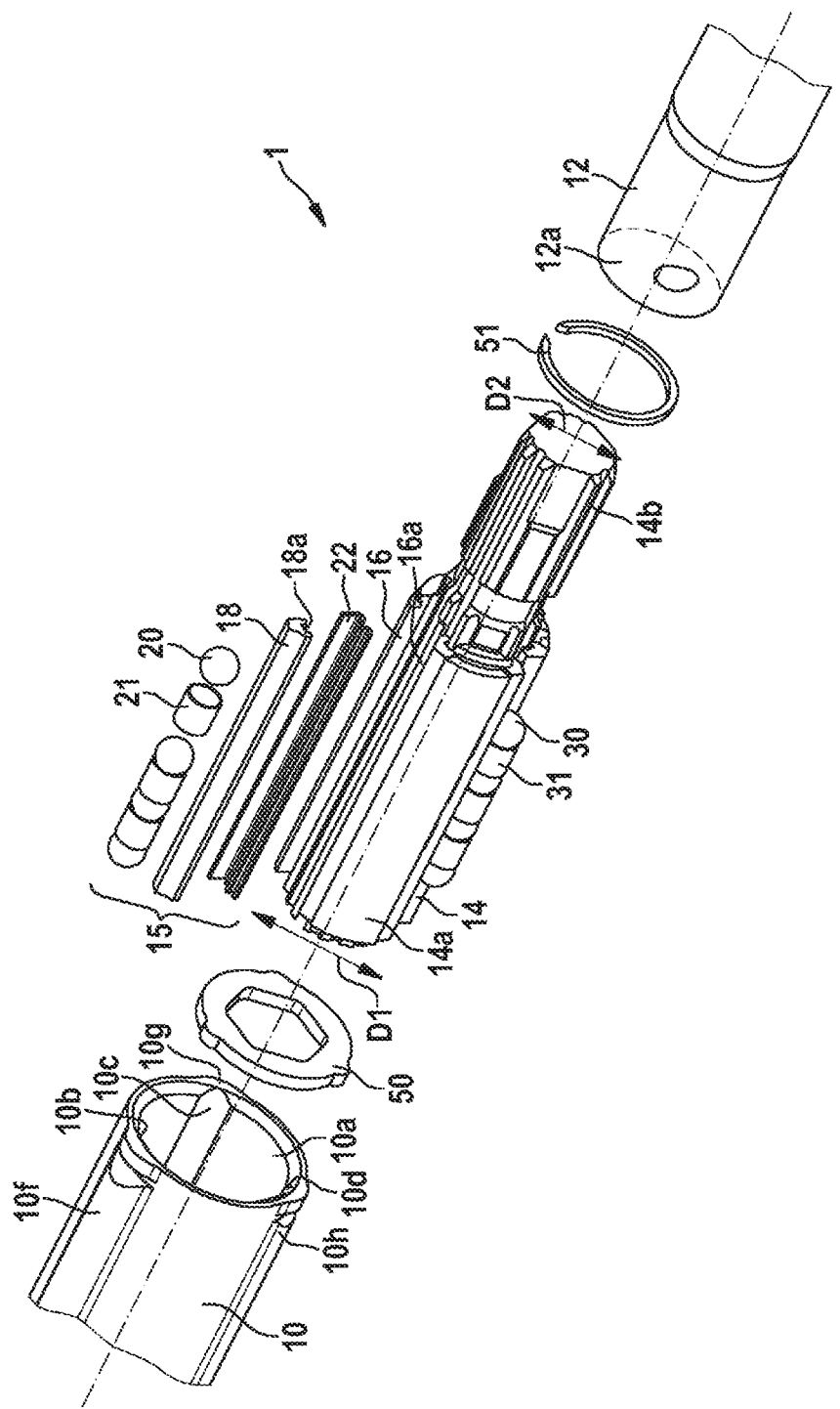

FIG. 9 is an exploded illustration of the intermediate steering shaft for a motor vehicle as per the preferred embodiment of the disclosure.

The intermediate steering shaft 1 for a motor vehicle has the outer hollow shaft 10, the inner hollow shaft 12 and the profiled shaft 14 which connects the outer hollow shaft 10 and the inner hollow shaft 12 to one another. The profiled shaft 14 is designed such that it can be guided by means of a multiplicity of guide arrangements in the outer hollow shaft 10. The illustration of FIG. 9 shows only one of the multiplicity of guide arrangements. The guide arrangements 15 permit a displacement of the profiled shaft 14, and of the inner hollow shaft 12, which is connected to said profiled shaft, in the axial direction of the outer hollow shaft 10.

The multiplicity of guide arrangements 15 has in each case one section 10b, 10c, 10d of substantially concave form on the inner circumference 10a of the outer hollow shaft 10, in each case one guide rail 18 of substantially concave form arranged on the receiving section 16 of the profiled shaft, and in each case a multiplicity of balls 20, 30 arranged between the section 10b, 10c, 10d of in each case substantially concave form of the outer hollow shaft 10 and the guide rail 18 of in each case substantially concave form. The balls 20, 30 are preferably separated from one another in each case by spacers 21, 31. The spacers 21, 31 advantageously have a cylindrical shape with inner surfaces of concave form.

The intermediate steering shaft 1 furthermore has the securing ring 50 arranged on the end section of the profiled shaft 14. The circlip 51 is arranged in a central region of the profiled shaft 14. The securing ring 50 and the circlip 51 serve as axial delimitations of the guide arrangements 15. The securing ring 50 is pressed onto the profiled shaft 14 and is fixed there by calking.

Figure 10:
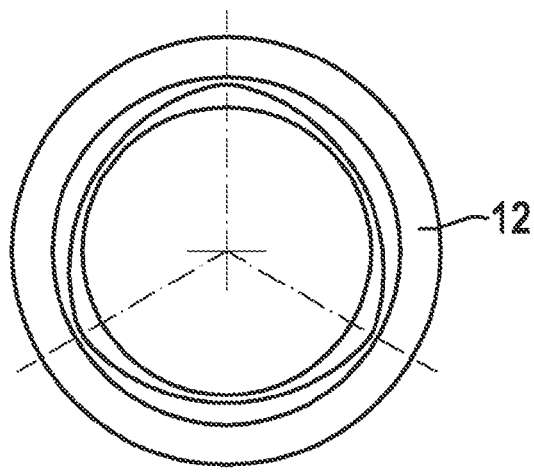

FIG. 10 shows a cross-sectional view of an inner hollow shaft, illustrated in FIG. 9, of the intermediate steering shaft for a motor vehicle as per the preferred embodiment of the disclosure.

By means of corresponding machining, for example by means of turning and/or milling, the inner hollow shaft 12 has different inner diameters. Owing to the formation of different, eccentric inner diameters of the inner hollow shaft 12, simple insertion of the profiled shaft 14 with a clearance fit SP, and an interference fit PP of the profiled shaft 14 in an adjacent section of the inner hollow shaft 12, can be made possible. The different fits of the profiled shaft 14 in the inner hollow shaft 12 result both from the design of the inner hollow shaft 12 with different diameters and owing to the design of the profiled shaft 14, which has different diameters within the second section 14b. As can be seen in the exploded illustration of FIG. 9, the profiled shaft 14 has a smaller diameter in the second section 14b directly adjacent to the inner hollow shaft 12 than in a section of the second section 14b adjacent to the first section 14a.

Figure 11:
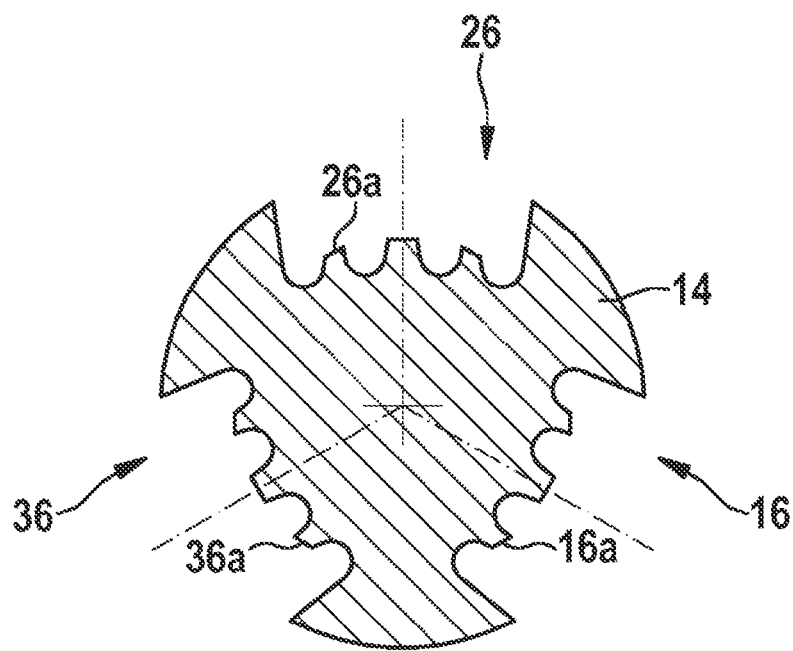

FIG. 11 shows a cross-sectional view of a profiled shaft, illustrated in FIG. 9, of the intermediate steering shaft for a motor vehicle as per the preferred embodiment of the disclosure. Analogously to the illustration of FIG. 8, the eccentric cylindrical form of the profiled shaft 14 is illustrated. The first receiving section 16 with the toothing 16a, the second receiving section 26 with the toothing 26a and the third receiving section 36 with the toothing 36a are in the present exemplary embodiment spaced apart from one another in each case at angular intervals of 120°. Some other suitable angular interval may alternatively also be provided.

Figure 12:
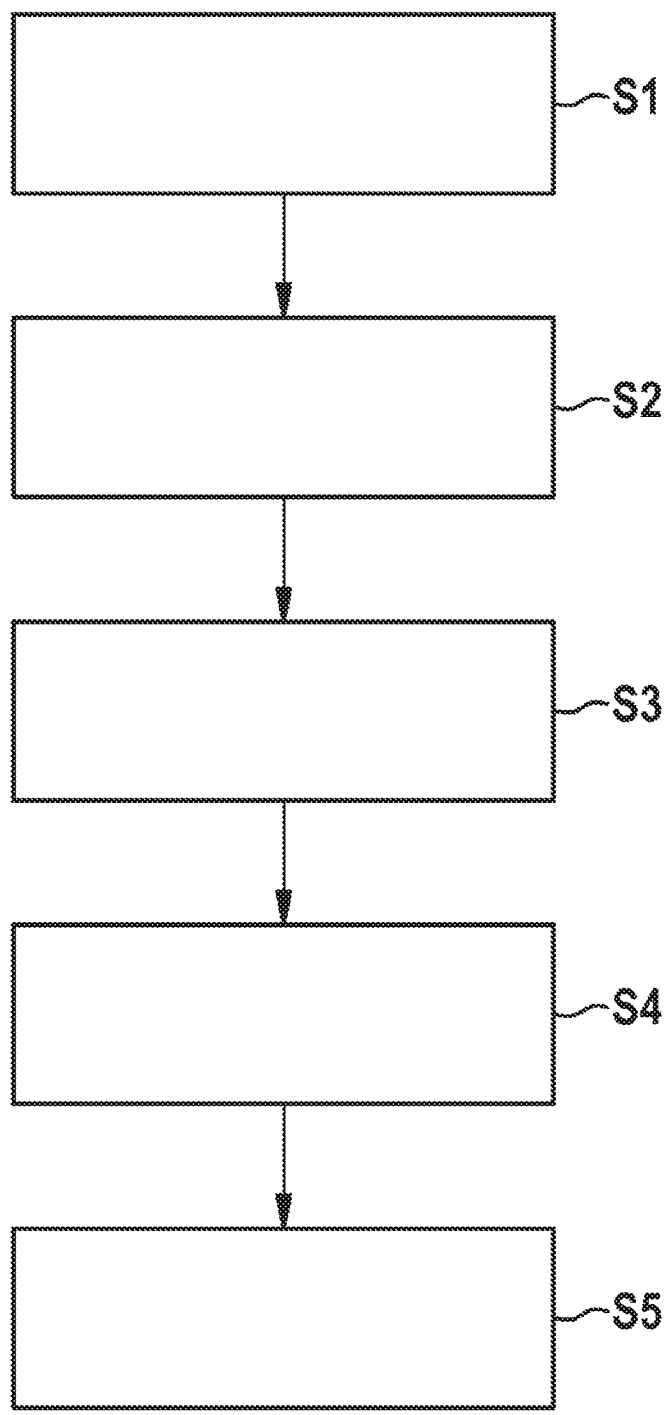

FIG. 12 shows a flow diagram of a method for operating an intermediate steering shaft for a motor vehicle as per the preferred embodiment of the disclosure.

The method for operating the intermediate steering shaft for a motor vehicle comprises providing S1 an outer hollow shaft. The method furthermore comprises providing S2 an inner hollow shaft which is arranged at least partially in the outer hollow shaft. The method moreover comprises providing S3 a profiled shaft which is arranged in the outer hollow shaft and which connects the outer hollow shaft and the inner hollow shaft to one another. The method moreover comprises providing S4 a multiplicity of guide arrangements which guide the profiled shaft in the outer hollow shaft and which serve for the displacement of the profiled shaft and of the inner hollow shaft, which is connected to said profiled shaft, in an axial direction of the outer hollow shaft, wherein the multiplicity of guide arrangements provides in each case one section of substantially concave form on an inner circumference of the outer hollow shaft, in each case one guide rail of substantially concave form arranged on a receiving section of the profiled shaft, and in each case a multiplicity of balls arranged between the section of in each case substantially concave form of the outer hollow shaft and the guide rail of in each case substantially concave form, wherein an elastic element is provided between the respective guide rail and the receiving section of the profiled shaft, which elastic element compensates a play of the guide arrangement and transmits a torque exerted on the guide arrangement by the outer hollow shaft to the profiled shaft.

Even though the present disclosure has been described above on the basis of preferred exemplary embodiments, it is not restricted to these and may be modified in a variety of ways. In particular, the disclosure may be changed or modified in numerous ways without departing from the essence of the disclosure.

For example, a shape, dimension and/or machining or production method of the components of the intermediate steering shaft may be modified.

LIST OF REFERENCE DESIGNATIONS

1 Intermediate steering shaft
10 Outer hollow shaft
10a Inner circumference (of the outer hollow shaft)
10b First section (of the inner circumference of the outer hollow shaft)
10c Second section (of the inner circumference of the outer hollow shaft)
10d Third section (of the inner circumference of the outer hollow shaft)
10e Outer circumference
10f First section (of the outer circumference of the outer hollow shaft)
10g Second section (of the outer circumference of the outer hollow shaft)
10h Third section (of the outer circumference of the outer hollow shaft)
12 Inner hollow shaft
12a Inner circumference (of the inner hollow shaft)
14 Profiled shaft
14a First section (of the profiled shaft)
14b Second section (of the profiled shaft)
15 First guide arrangement
16 First receiving section (of the guide arrangement)
16a Toothing (of the first receiving section)
18 First guide rail
18a Toothing (of the first guide rail)
20 Balls
21 First spacer
22 First elastic element
25 Second guide arrangement
26 Second receiving section (of the guide arrangement)
26a Toothing (of the second receiving section)
28 Second guide rail
28a Toothing (of the second guide rail)
30 Balls
31 Second spacer
32 Second elastic element
35 Third guide arrangement
36 Third receiving section (of the guide arrangement)
36a Toothing (of the third receiving section)
38 Third guide rail
38a Toothing (of the third guide rail)
40 Balls
41 Third spacer
42 Third elastic element
50 Securing ring
51 Circlip
61, 62 Ball joint
63 Stripper
D1 First diameter
D2 Second diameter
SP Clearance fit
PP Interference fit

The invention claimed is:

1. An intermediate steering shaft for a motor vehicle, comprising:
   an outer hollow shaft;
   an inner hollow shaft arranged at least partially in the outer hollow shaft;
   a profiled shaft that is arranged in the outer hollow shaft and connects the outer hollow shaft and the inner hollow shaft to one another, the inner hollow shaft connected to the profiled shaft; and
   a plurality of guide arrangements that guide the profiled shaft in the outer hollow shaft and serve for the displacement of the profiled shaft and of the inner hollow shaft-in an axial direction of the outer hollow shaft,
   wherein the plurality of guide arrangements has in each case (i) one section of substantially concave form on an inner circumference of the outer hollow shaft, (ii) one guide rail of substantially concave form arranged on a receiving section of the profiled shaft, and (iii) at least one ball arranged between the section and the guide rail,
   wherein an elastic element is arranged between the respective guide rail and the receiving section of the profiled shaft, the elastic element configured to provide play compensation of the guide arrangement and to transmit a torque exerted on the guide arrangement by the outer hollow shaft to the profiled shaft, and
   wherein the elastic element is formed by a rubber strip that is configured to be installed, by vulcanization, between the respective guide rail and the respective receiving section of the profiled shaft.

2. The intermediate steering shaft as claimed in claim 1, wherein the respective elastic element is configured to be compressed in a thickness direction when a torque is applied and configured to be placed under shear load in a width direction in the case of play compensation of the guide arrangement.

3. The intermediate steering shaft as claimed in claim 1, wherein:
the profiled shaft has a first section with a first diameter, at which said profiled shaft is, at a respective receiving section of the profiled shaft, connected rotationally conjointly by the guide arrangement to an inner circumference of the outer hollow shaft,
the profiled shaft has a second section with a second diameter, at which said profiled shaft is connected rotationally conjointly to an inner circumference of the inner hollow shaft, and
the second diameter is smaller than the first diameter.

4. The intermediate steering shaft as claimed in claim 1, wherein:
the outer hollow shaft, in the region of the sections of substantially concave form on its inner circumference, has in each case one section of substantially concave form on its outer circumference, and
a bulge of the sections formed in each case on the inner circumference of the outer hollow shaft substantially corresponds to a bulge of the sections formed in each case on the outer circumference of the outer hollow shaft.

5. The intermediate steering shaft as claimed in claim 1, wherein a wall thickness of the outer hollow shaft is formed so as to be greater in the region of the sections of substantially concave form on its inner circumference and in the region of the sections formed on the outer circumference of the outer hollow shaft than in a remaining circumferential region of the outer hollow shaft.

6. The intermediate steering shaft as claimed in claim 1, wherein the respective guide rail is of substantially concave form on a side facing toward the outer hollow shaft and has a toothing on a side facing toward the profiled shaft, which toothing engages with a toothing of the receiving section.

7. The intermediate steering shaft as claimed in claim 1, wherein the plurality of balls are separated from one another in each case by spacers, and wherein the spacers have a cylindrical shape with inner surfaces of concave form.

8. The intermediate steering shaft as claimed in claim 1, wherein the profiled shaft has a substantially eccentric cylindrical cross section, and wherein the profiled shaft has a clearance fit in a first section of the inner hollow shaft and has an interference fit in a second section of the inner hollow shaft.

9. A method for operating an intermediate steering shaft for a motor vehicle, the intermediate steering shaft including an outer hollow shaft, an inner hollow shaft arranged at least partially in the outer hollow shaft, a profiled shaft that is arranged in the outer hollow shaft and connects the outer hollow shaft and the inner hollow shaft to one another, and a plurality of guide arrangements that include in each case one section of substantially concave form on an inner circumference of the outer hollow shaft, in each case one guide rail of substantially concave form arranged on a receiving section of the profiled shaft, and in each case at least one ball arranged between the section and the guide rail, the method comprising:
guiding the profiled shaft in the outer hollow shaft with the plurality of guide arrangements for the displacement of the profiled shaft and of the inner hollow shaft, which is connected to the profiled shaft, in an axial direction of the outer hollow shaft; and
compensating play and transmitting a torque exerted on the guide arrangement by the outer hollow shaft to the profiled shaft by way of an elastic element provided between the respective guide rail and the receiving section of the profiled shaft,
wherein the elastic element is formed by a rubber strip that is installed, by vulcanization, between the respective guide rail and the respective receiving section of the profiled shaft.

10. The method as claimed in claim 9, wherein the respective elastic element is compressed in a thickness direction when a torque is applied and is placed under shear load in a width direction in the case of play compensation of the guide arrangement.

* * * * *